US007016883B2

(12) United States Patent
Dispensa et al.

(10) Patent No.: US 7,016,883 B2
(45) Date of Patent: Mar. 21, 2006

(54) REVERSE CACHING FOR RESIDENTIAL END-USERS TO REDUCE USAGE OF ACCESS LINKS TO A CORE COMMUNICATION NETWORK

(75) Inventors: Steve Dispensa, Shawnee Mission, KS (US); Steve Myers, Lee's Summit, MO (US); Jason M. Sloderbeck, Kansas City, MO (US); Jonathon Spaeth, Cleveland, OH (US)

(73) Assignee: Sprint Communications Company L.P., Overland Park, KS (US)

( * ) Notice: Subject to any disclaimer, the term of this patent is extended or adjusted under 35 U.S.C. 154(b) by 702 days.

(21) Appl. No.: 10/128,036

(22) Filed: Apr. 23, 2002

(65) Prior Publication Data
US 2003/0200276 A1    Oct. 23, 2003

(51) Int. Cl.
*G06F 15/18* (2006.01)
(52) U.S. Cl. .............................. 706/14; 706/12; 706/46
(58) Field of Classification Search .................. 706/14, 706/12, 46; 711/138, 119; 709/203, 213
See application file for complete search history.

(56) References Cited

U.S. PATENT DOCUMENTS 6,167,438 A * 12/2000 Yates et al. ................. 709/216
6,324,182 B1   11/2001 Burns et al.
6,701,415 B1 *  3/2004 Hendren, III ............... 711/138
6,874,017 B1 *  3/2005 Inoue et al. ................. 709/217
2002/0147895 A1 * 10/2002 Glance et al. .............. 711/158
2003/0149787 A1 *  8/2003 Mangan ...................... 709/238
2004/0049579 A1 *  3/2004 Ims et al. ................... 709/225

FOREIGN PATENT DOCUMENTS

WO    WO 02/19653 A2    3/2002

OTHER PUBLICATIONS

"Limewire: The Best Gnutella Client Software" Mar. 2, 2001, XP002189423 retrieved the the Internet, www.limewire.com/index.jsp/net.

* cited by examiner

*Primary Examiner*—Joseph P. Hirl

(57) ABSTRACT

A reverse caching system monitors residential end-user communications to cache content files when they are transferred from the residential end-users over access links to a core communication network. The reverse caching system monitors the residential end-user communications to identify requests for the content files cached in the reverse caching system. In response to identifying the requests, the reverse caching system transfers the requested content files from the reverse caching system to the core communication network.

30 Claims, 5 Drawing Sheets

REVERSE CACHING FOR RESIDENTIAL END-USERS TO REDUCE USAGE OF ACCESS LINKS TO A CORE COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to technology for reducing the usage of access links to a core network.

2. Description of the Prior Art

Most communication networks that serve residential end-users can be viewed as a core communication network that is connected to the residential end-users over access links. In one example of such network, the core communication network is the Internet and the access links are wireless links to an Internet portal. To access the Internet, the residential end-users operate wireless transceivers to communicate over wireless access links.

These access links often form a bandwidth bottleneck on communications between the residential end-users. Thus, the bandwidth on the access connections is typically much lower than that available in the core communication network. If the access links operate as a shared medium among multiple residential end-users, then the bandwidth bottleneck can be especially severe during periods of heavy usage. The unfortunate result is diminished communication services to all residential end-users who share the access links.

File sharing protocols are becoming popular among residential end-users. Some examples of these end-user file sharing protocols are Napster and Gnutella. These file sharing protocols allow residential end-users to become content hosts that serve up content files, such as songs and movies, over the Internet. The file sharing protocols allow others around the world to locate and download a desired song or movie from a specific residential end-user.

Unfortunately, the residential end-users transfer their content files over their access links to the core communication network. Typically, the transfer of content files requires significant bandwidth. The transfer of content files over the access links degrades communication services to all who share the access links. When a residential end-user hosts a popular content file, communication services can be seriously degraded.

SUMMARY OF THE INVENTION

The invention helps solve the above problems by reducing the usage of the access links when residential end-users share content files. The reduction in usage maintains a higher quality of communication services for all users who share the access links. The invention is especially effective when a residential end-user hosts a popular content file because the access links are not repeatedly used to transfer the popular content file.

Examples of the invention include reverse caching systems, methods of operating reverse caching systems, and software products for directing reverse caching systems. In the context of the invention, residential end-users are coupled to access links, the access links are coupled to the reverse caching system, the reverse caching system is coupled to a core communication network. The residential end-users host content files for transfer over the access links and the core communication network. The access links may comprise wireless links or coaxial cables. The core communication network may comprise the Internet. The content files may comprise audio or video.

The reverse caching system monitors residential end-user communications to cache transferred ones of the content files in the reverse caching system when the transferred ones of the content files are transferred from the residential end-users over the access links to the core network. The reverse caching system monitors the residential end-user communications to identify requests for requested ones of the content files cached in the reverse caching system. In response to identifying the requests for the requested ones of the content files cached in the reverse caching system, the reverse caching system transfers the requested ones of the content files from the reverse caching system to the core communication network.

The reverse caching system may filter the residential end-user communications to detect an end-user file sharing protocol. The reverse caching system may check a database to determine that the transferred ones of the content files may be legally cached in the reverse caching system. The reverse caching system may, in response to identifying the requests for the requested ones of the content files cached in the reverse caching system, inhibit a transfer over the access links of the requested ones of the content files responsive to the requests. The reverse caching system may maintain a data structure associating individual ones of the residential end-users with individual cached ones of the content files.

BRIEF DESCRIPTION OF THE DRAWINGS

The same reference number represents the same element on all drawings.

DETAILED DESCRIPTION OF THE PREFERRED EMBODIMENT

FIGS. 1–5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
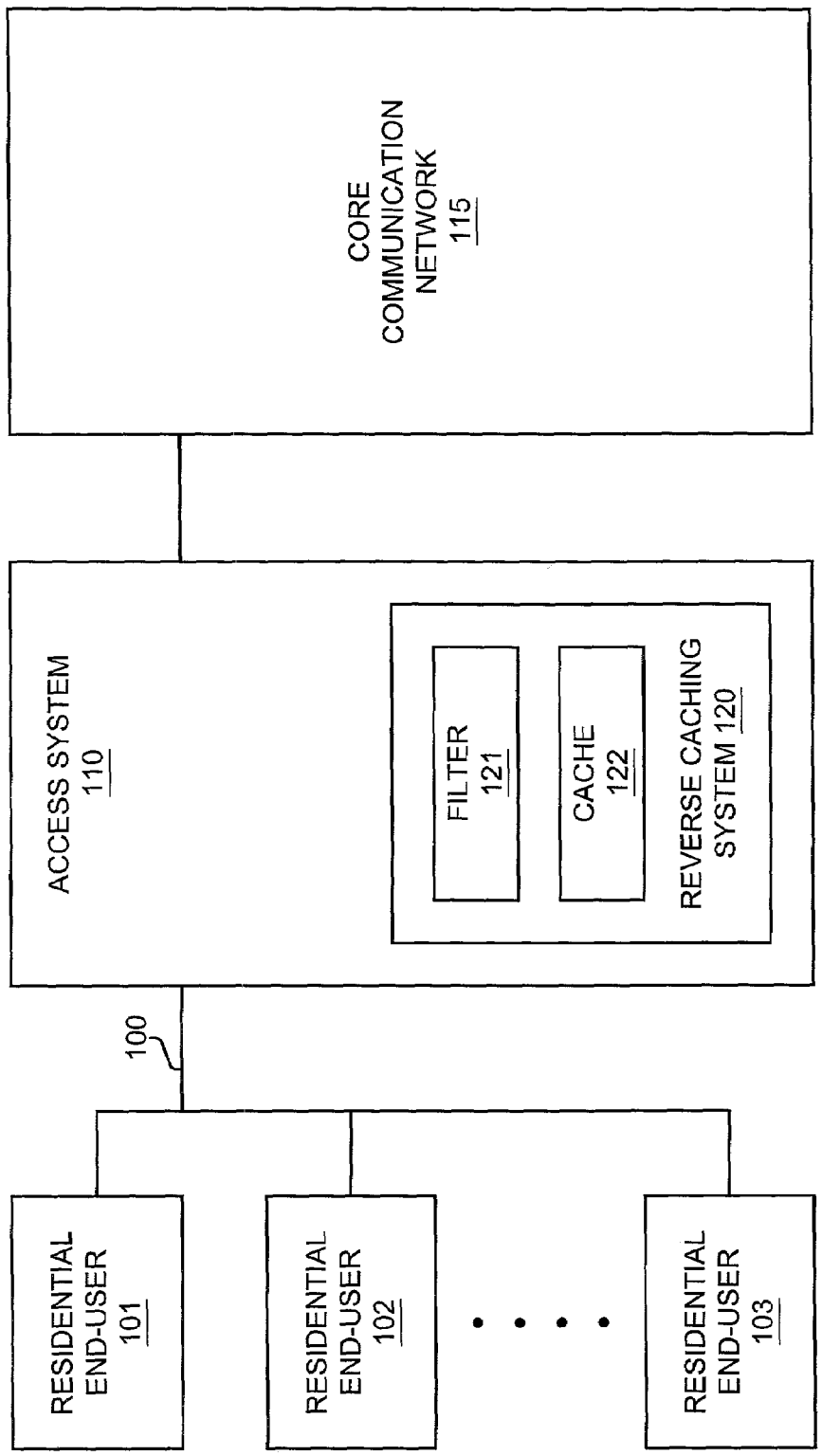
FIG. 1 illustrates a reverse caching environment in an example of the invention.
Figure 2:
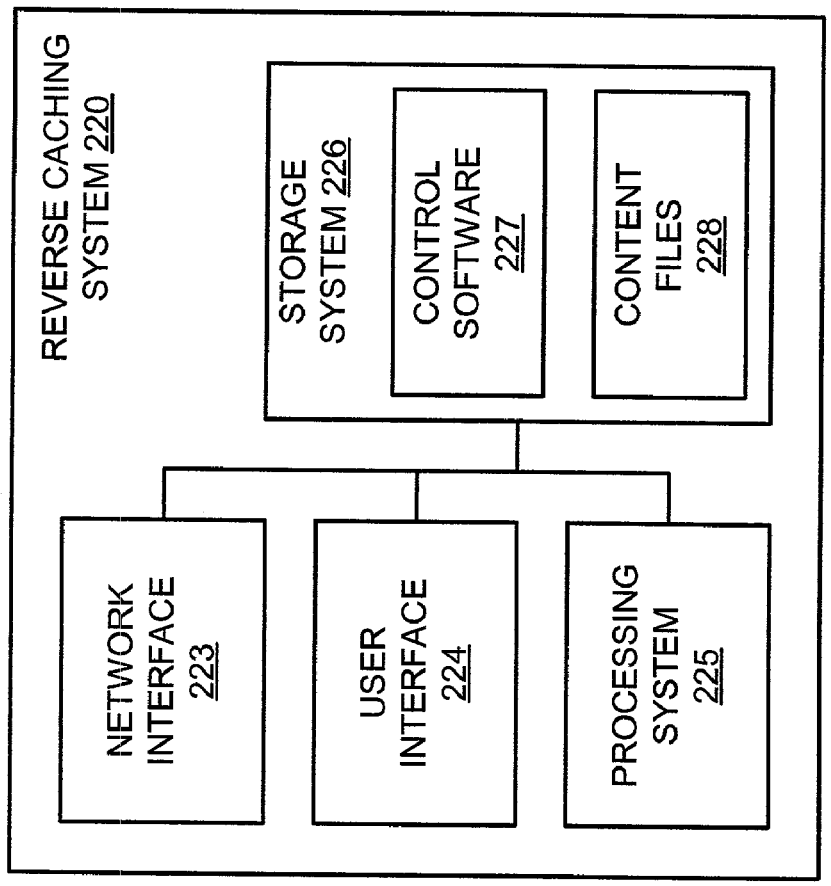
FIG. 2 illustrates a reverse caching system in an example of the invention.

Reverse Caching System Configuration—FIGS. 1–2

FIG. 1 illustrates a reverse caching environment in an example of the invention. Residential end-users 101–103 are coupled to access links 100. Access links 100 are coupled to access system 110. Access system 110 is coupled to core communication network 115. Access system 110 includes reverse caching system 120.

Core communication network 115 could be the Internet or some other data communication system available to residential end-users. Access system 110 could be an Internet service provider or some other portal to core communication network 115. Access links 100 could use metallic, optical fiber, wireless link (air), or some other media. Examples of metallic media include coaxial cable and twisted pair wires. Access links 100 could use multipoint multiservice distribution system, code division multiple access, analog telephony, digital subscriber line, Internet protocol, Ethernet, asynchronous transfer mode, or some other type of communication protocol.

Residential end-users 101–103 are individual persons living in a residence, such as a home or apartment. Residential end-users 101–103 operate end-user systems that are coupled to access links 100. The end-user systems could be computers, televisions, telephones, digital assistants, Internet appliances, or some other type of communication device. Residential end-users 101–103 host content files, such as audio and video files. Residential end-users 101–103 use an end-user file sharing protocol, such as Napster or Gnutella, to transfer their content files over access links 100 to core communication network 115.

Reverse caching system 120 includes filter 121 and cache 122. Cache 122 is configured to store the content files. Filter 121 monitors residential end-user communications to cache content files that are transferred from residential end-users 101–103 over access links 100 to core network 115. Filter 121 also monitors the residential end-user communications to identify requests for the content files that are in cache 122. In response to identifying the requests, filter 121 transfers the requested content files from cache 122 to core communication network 115. Advantageously, the usage of access links 100 is reduced because they do not repeatedly transfer the same content files. This usage reduction maintains higher quality communication services for residential end-users 101–103.

FIG. 2 illustrates reverse caching system 220 in an example of the invention. Reverse caching system 220 includes network interface 223, user interface 224, processing system 225, and storage system 226. Storage system 226 stores control software 227 and content files 228. Processing system 102 is linked to network interface 223, user interface 224, and storage system 226. Reverse caching system 220 could be comprised of a programmed general purpose computer, although those skilled in the art will appreciate that programmable or special purpose circuitry and equipment may be used. Reverse caching system 220 may use a client server architecture where operations are distributed among a server system and client devices that together comprises elements 223–228.

Network interface 223 could comprise a network interface card or some other communication device. Network interface may include a packet filtering application specific integrated circuit configured to detect packets that use specific end-user file sharing protocols. For example, a digital filter could be configured to detect Napster or Gnutella packets. Network interface 223 may be distributed among multiple communication devices.

User interface 224 could comprise a keyboard, mouse, voice recognition interface, graphical display, touch screen, or some other type of user device. Processing system 225 could comprise a computer microprocessor, logic circuit, or some other processing device. Processing system 225 may be distributed among multiple processing devices. Storage system 226 could comprise a disk, tape, integrated circuit, server, or some other memory device. Storage system 226 may be distributed among multiple memory devices.

Processing system 225 retrieves and executes control software 227 from storage system 226. Control software 227 could comprise an application program, firmware, or some other form of machine-readable processing instructions. When executed by processing system 225, control software 227 directs processing system 225 to operate in accord with the invention.

Network interface 223, processing system 225, storage system 226, and control software 227 could comprise filter 121 of FIG. 1. Storage system 226 and content files 228 could comprise cache 122 of FIG. 1. User interface 224 could be used for configuration and data output for either filter 121 or cache 122.

Figure 3:
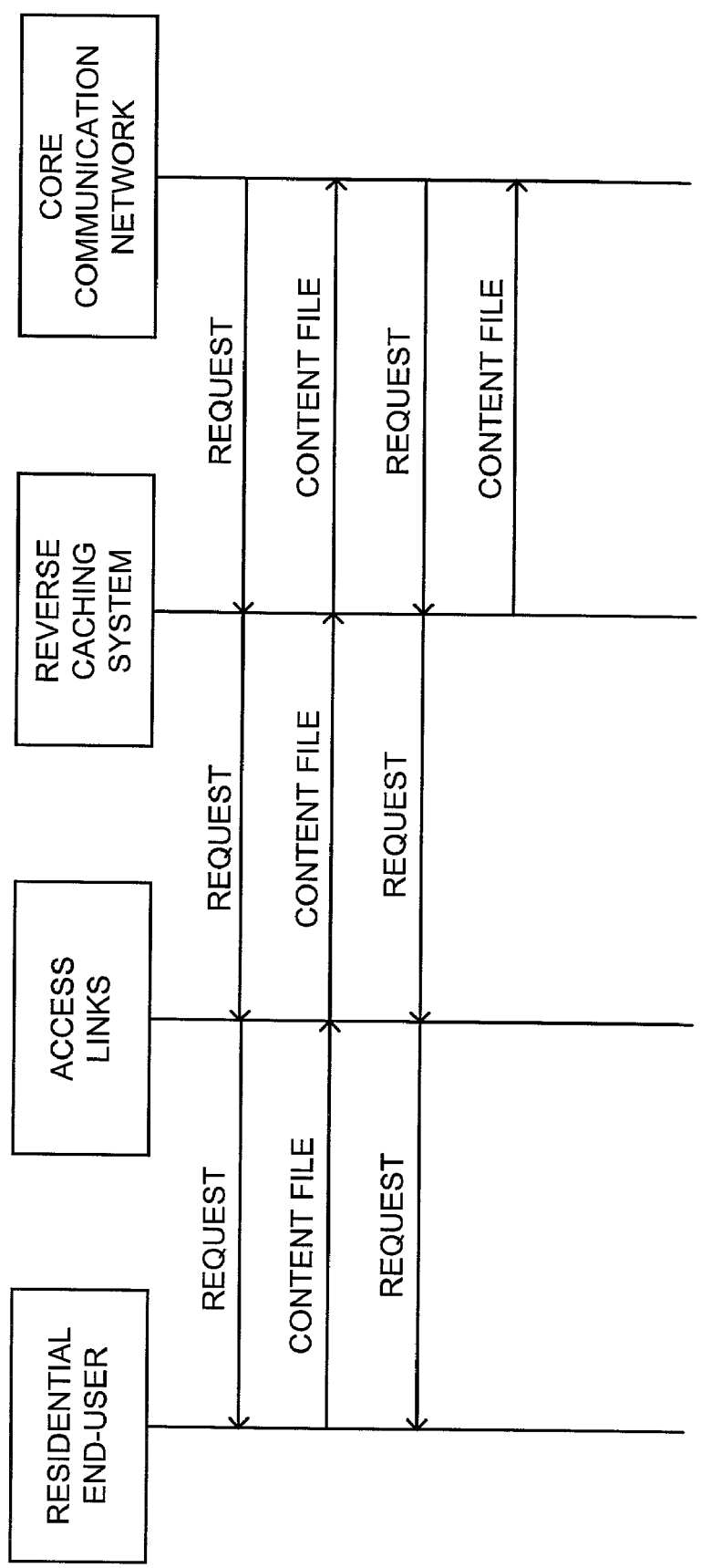
FIG. 3 illustrates a reverse caching communication sequence in an example of the invention.
Figure 4:
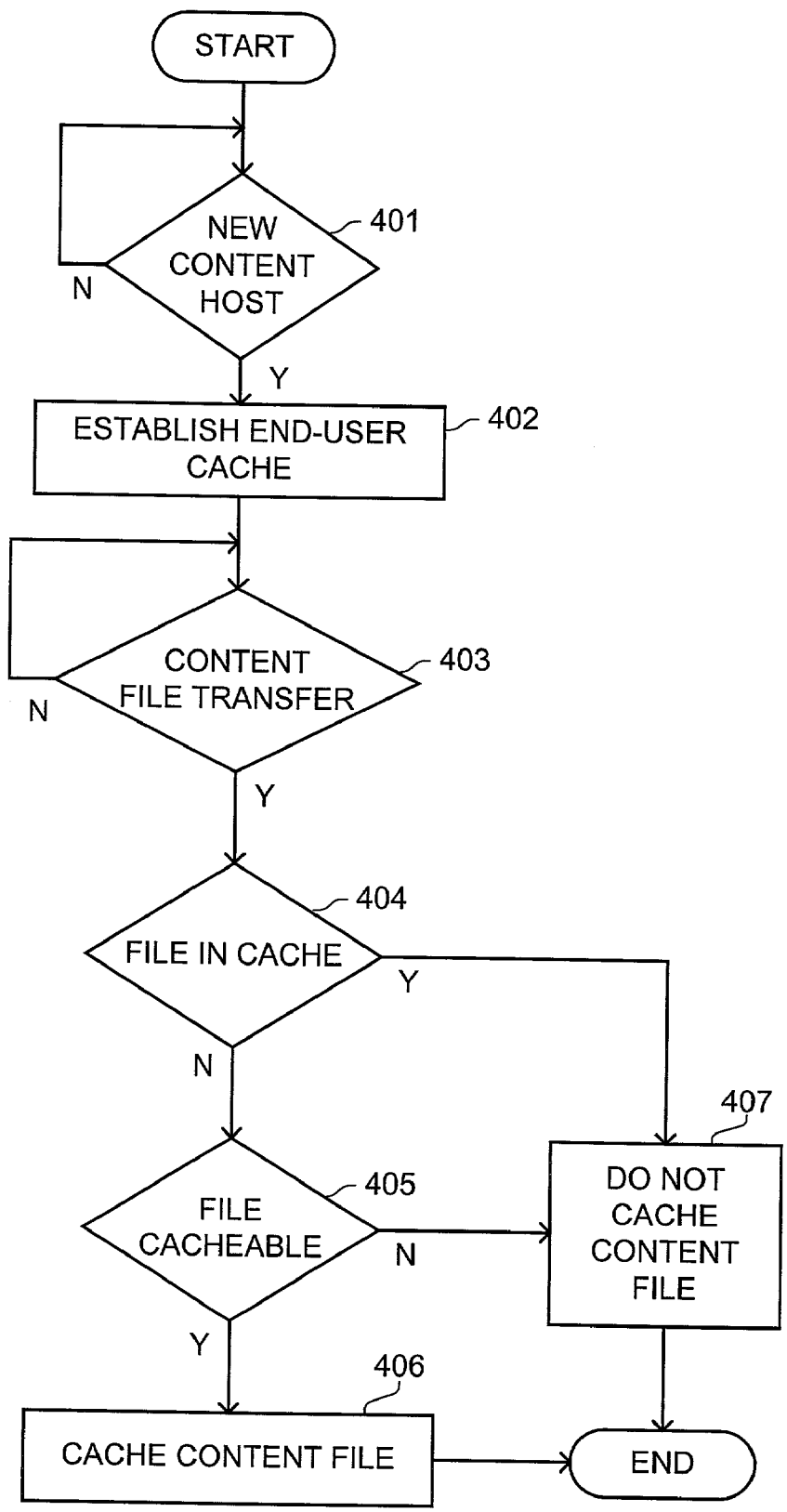
FIG. 4 illustrates reverse caching system operation in an example of the invention.
Figure 5:
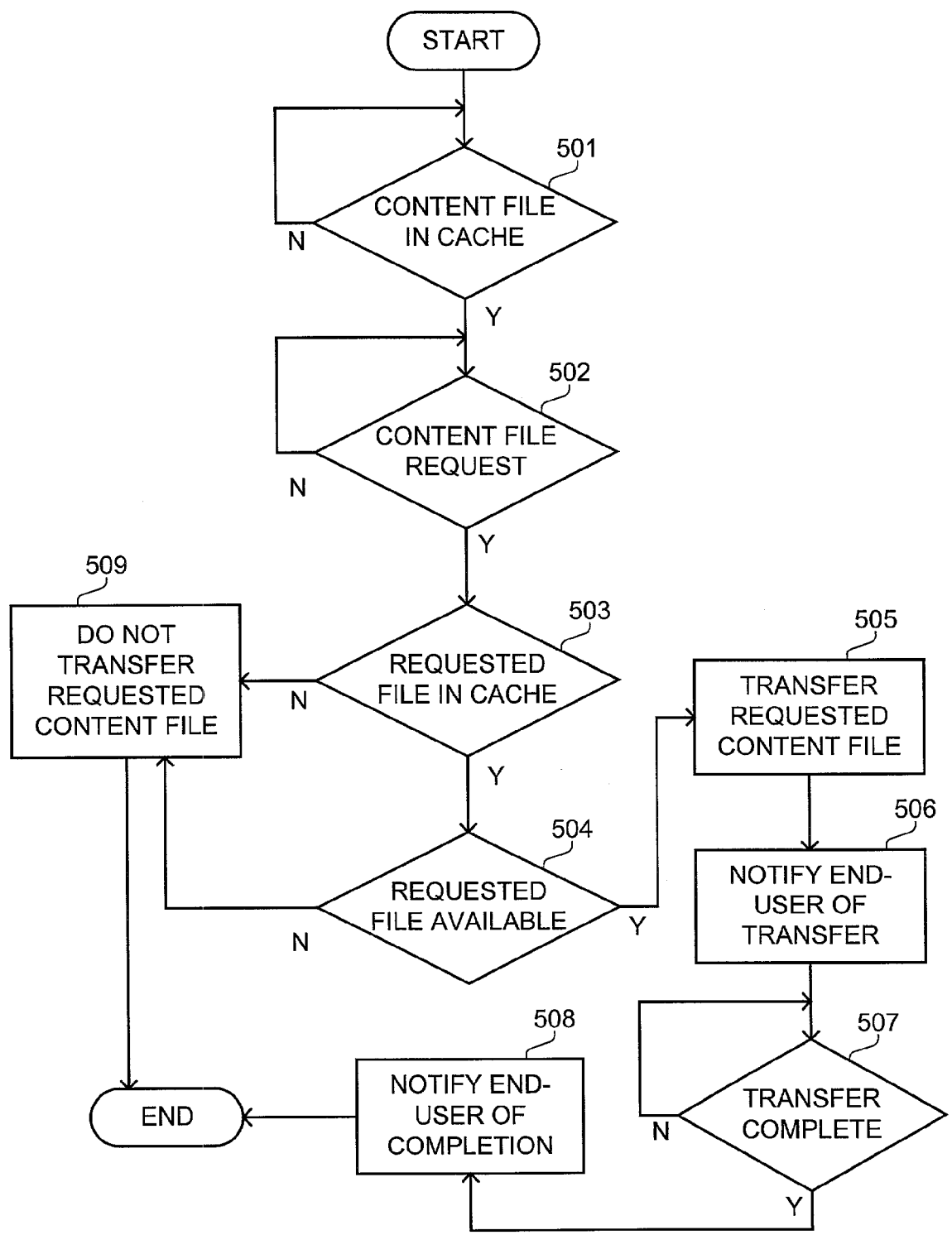
FIG. 5 illustrates reverse caching system operation in an example of the invention.

Reverse Caching System Operation—FIGS. 3–5

FIG. 3 illustrates a reverse caching communication sequence in an example of the invention. Initially, another end-user sends a request for a content file to the residential end-user through the core communication network, reverse caching system, and access links. In response to the request, the residential end-user transfers the requested content file to the other end-user through the access links, reverse caching system, and core communication network. The reverse caching system caches the content file during this file transfer.

Subsequently, the other end-user sends another request for the content file to the residential end-user through the core communication network, reverse caching system, and access links. In response to the request, the reverse caching system transfers the requested content file to the other end-user through the core communication network. Note that access links are not required to subsequently transfer the content file—resulting in significant bandwidth savings on the access links.

FIG. 4 illustrates reverse caching system operation in an example of the invention, and operational steps are indicated parenthetically. The reverse caching system monitors residential end-user communications to identify residential end-users that become content file hosts (401). For example, filter circuitry in the reverse caching system may detect the use of an end-user file sharing protocol or a communication with a file sharing registration server. If a new content file host is identified among the residential end-users, then the reverse caching system establishes a cache for that particular residential end-user (402).

The reverse caching system then monitors the residential end-user communications to identify content file transfers from the residential end-user (403). For example, filter circuitry in the reverse caching system may detect the use of an end-user file sharing protocol. The reverse caching system determines if the transferred content file is already in the end-user cache (404). If not, then a database check is made to determine if the particular content file is cacheable (405). For example, the database may indicate if the residential end-user has the appropriate legal rights for reverse caching the transferred content file. If the transferred content file is cacheable, but is not in the cache, then the reverse caching system caches the content file in the residential end-user cache (406). If the transferred content file is not cacheable, or is already in the cache, then the reverse caching system does not cache the content file (407).

FIG. 5 illustrates reverse caching system operation in an example of the invention. After the residential end-user has a content file in the end-user cache (501), the reverse caching system monitors the residential end-user communications to identify requests for content file transfers directed to the residential end-user (502). For example, filter circuitry in the reverse caching system may detect the use of an end-user file sharing protocol. The reverse caching system then determines if the requested content file is in the end-user cache (503). If so, the reverse caching system determines if the content file is available for transfer (504). For example, concurrent use by the requesting end-user and the residential end-user may not be allowed, so a check would be made to determine if the residential end-user was currently using the content file.

If the requested content file is in the end-user cache and available for transfer, then the reverse caching system transfers the requested content file from the end-user cache to the core communication network (505). The reverse caching system also notifies the residential end-user of the transfer (506). The notification inhibits any content file transfer from the residential end-user over the access links. The notification also prevents improper concurrent use of the content file. After the transfer from cache is complete (507), the reverse caching system notifies the residential end-user, so they can again properly use the content file (508). If the requested content file is not in the end-user cache, or if the content file is not available for transfer, then the reverse caching system does not transfer the requested content file (509).

The reverse caching system may establish a cache for each individual residential end-user and treat each cache separately. This might entail maintaining a data structure that associates individual residential end-users with individual cached content files. Alternatively, the reverse caching system may pool all content files in a common cache to reduce duplicate content file storage. The reverse caching system may also group all residential end-users sharing the same access links as one virtual end-user to further simplify the system.

What is claimed is:

1. A method of operating a reverse caching system wherein residential end-users are coupled to access links, the access links are coupled to the reverse caching system, the reverse caching system is coupled to a core communication network, and the residential end-users host content files for transfer over the access links and the core communication network, the method comprising:
    monitoring residential end-user communications to cache transferred ones of the content files in the reverse caching system when the transferred ones of the content files are transferred from the residential end-users over the access links to the core network;
    monitoring the residential end-user communications to identify requests for requested ones of the content files cached in the reverse caching system;
    in response to identifying the requests for the requested ones of the content files cached in the reverse caching system, determining if the requested ones of the content files cached in the reverse caching system are available for concurrent use; and
    in response to determining that the requested ones of the content files cached in the reverse caching system are available for concurrent use, transferring the requested ones of the content files from the reverse caching system to the core communication network.

2. The method of claim 1 wherein monitoring the residential end-user communications to cache the transferred ones of the content files and to identify the requests comprises filtering the residential end-user communications to detect an end-user file sharing protocol.

3. The method of claim 1 wherein monitoring the residential end-user communications to cache the transferred ones of the content files further comprises checking a database to determine that the transferred ones of the content files may be legally cached in the reverse caching system.

4. The method of claim 1 further comprising, in response to identifying the requests for the requested ones of the content files cached in the reverse caching system, inhibiting a transfer over the access links of the requested ones of the content files responsive to the requests.

5. The method of claim 1 further comprising maintaining a data structure associating individual ones of the residential end-users with individual cached ones of the content files.

6. The method of claim 1 wherein the access links comprise wireless links.

7. The method of claim 1 wherein the access links comprise coaxial cables.

8. The method of claim 1 wherein the core communication network comprises the Internet.

9. The method of claim 1 wherein the content files comprise audio.

10. The method of claim 1 wherein the content files comprise video.

11. A reverse caching system wherein residential end-users are coupled to access links, the access links are coupled to the reverse caching system, the reverse caching system is coupled to a core communication network, and the residential end-users host content files for transfer over the access links and the core communication network, the reverse caching system comprising:
    a cache configured to store the content files; and
    a filter configured to monitor residential end-user communications to store transferred ones of the content files in the cache when the transferred ones of the content files are transferred from the residential end-users over the access links to the core network, monitor the residential end-user communications to identify requests for requested ones of the content files in the cache, and in response to identifying the requests for the requested ones of the content files in the cache, determine if the requested ones of the content files cached in the reverse caching system are available for concurrent use, and transfer the requested ones of the content files from the cache to the core communication network in response to determining that the requested ones of the content files cached in the reverse caching system are available for concurrent use.

12. The reverse caching system of claim 11 wherein the filter is configured to filter the residential end-user communications to detect an end-user file sharing protocol.

13. The reverse caching system of claim 11 wherein the filter is configured to check a database to determine that the transferred ones of the content files may be legally stored in the cache.

14. The reverse caching system of claim 11 wherein the filter is configured, in response to identifying the requests for the requested ones of the content files in the cache, to inhibit a transfer over the access links of the requested ones of the content files responsive to the requests.

15. The reverse caching system of claim 11 wherein the filter is configured to maintain a data structure associating individual ones of the residential end-users with individual cached ones of the content files.

16. The reverse caching system of claim 11 wherein the access links comprise wireless links.

17. The reverse caching system of claim 11 wherein the access links comprise coaxial cables.

18. The reverse caching system of claim 11 wherein the core communication network comprises the Internet.

19. The reverse caching system of claim 11 wherein the content files comprise audio.

20. The reverse caching system of claim 11 wherein the content files comprise video.

21. A software product for a reverse caching system wherein residential end-users are coupled to access links, the access links are coupled to the reverse caching system, the reverse caching system is coupled to a core communication network, and the residential end-users host content files for transfer over the access links and the core communication network, the software product comprising:

control software configured to direct the reverse caching system to monitor residential end-user communications to store transferred ones of the content files in cache when the transferred ones of the content files are transferred from the residential end-users over the access links to the core network, monitor the residential end-user communications to identify requests for requested ones of the content files in the cache, and in response to identifying the requests for the requested ones of the content files in the cache, determine if the requested ones of the content files cached in the reverse caching system are available for concurrent use, and transfer the requested ones of the content files from the cache to the core communication network in response to determining that the requested ones of the content files cached in the reverse caching system are available for concurrent use; and a storage system configured to store the control software.

22. The software product of claim 21 wherein the control software is configured to direct the reverse caching system to filter the residential end-user communications to detect an end-user file sharing protocol.

23. The software product of claim 21 wherein the control software is configured to direct the reverse caching system to check a database to determine that the transferred ones of the content files may be legally stored in the cache.

24. The software product of claim 21 wherein the control software is configured to direct the reverse caching system, in response to identifying the requests for the requested ones of the content files in the cache, to inhibit a transfer over the access links of the requested ones of the content files responsive to the requests.

25. The software product of claim 21 wherein the control software is configured to direct the reverse caching system to maintain a data structure associating individual ones of the residential end-users with individual cached ones of the content files.

26. The software product of claim 21 wherein the access links comprise wireless links.

27. The software product of claim 21 wherein the access links comprise coaxial cables.

28. The software product of claim 21 wherein the core communication network comprises the Internet.

29. The software product of claim 21 wherein the content files comprise audio.

30. The software product of claim 21 wherein the content files comprise video.

* * * * *